(No Model.)
G. HAUSCHILD.
WEED CUTTER.
No. 386,246. Patented July 17, 1888.
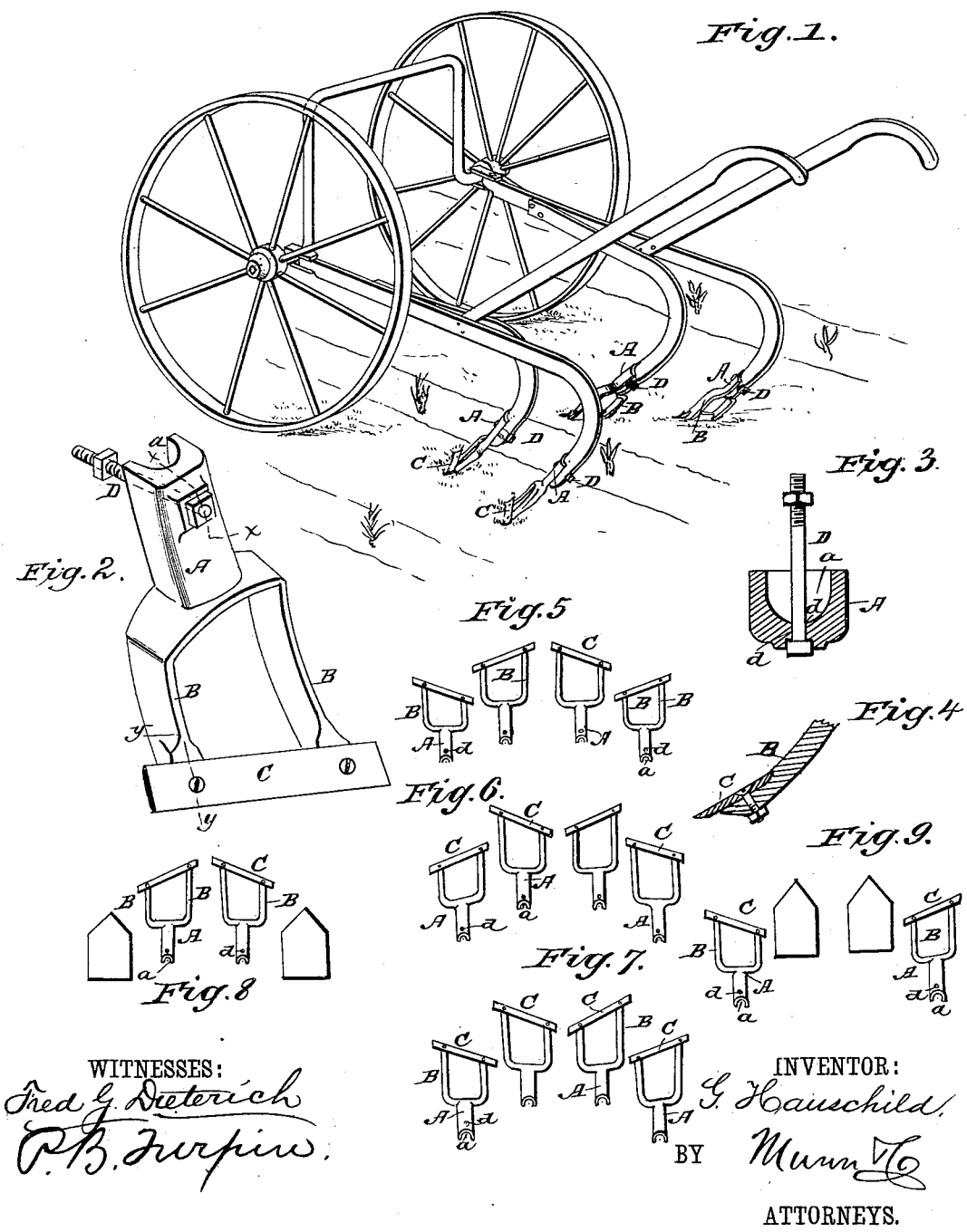
WITNESSES:
Fred G. Dieterich
P. B. Turpin
INVENTOR:
G. Hauschild
BY Munn & Co
ATTORNEYS.

UNITED STATES PATENT OFFICE.

GUSTAVUS HAUSCHILD, OF TOPEKA, KANSAS.

WEED-CUTTER.

SPECIFICATION forming part of Letters Patent No. 386,246, dated July 17, 1888.

Application filed November 3, 1887. Serial No. 254,223. (No model.)

*To all whom it may concern:*

Be it known that I, GUSTAVUS HAUSCHILD, of Topeka, in the county of Shawnee and State of Kansas, have invented a new and useful Improvement in Weed-Cutters, of which the following is a specification.

My invention is an improved weed-cutter, intended for use as an attachment to cultivators, and to be employed as substitutes for some or all of the cultivator-blades, the attachments being in some cases substituted for all of the cultivator teeth or blades, and in other instances simply substituted for some of such blades and used in conjunction with the others.

The invention consists in certain features of construction and novel combinations of parts, as will be hereinafter described and claimed.

In the drawings, Figure 1 is a perspective view of a cultivator-frame provided with my improvements. Fig. 2 is a perspective view of my attachment. Figs. 3 and 4 are detached sections on, respectively, lines *x x* and *y y* of Fig. 2; and Figs. 5, 6, 7, 8, and 9 are diagrammatic views showing different arrangements of my attachments, as will be hereinafter described.

The attachment comprises a stock or body, A, adapted for connection with the ordinary cultivator-standard, and having the arms B B extended from its lower end, one of said arms being usually longer than the other, in order to hold the blade C at the proper angle. This blade C is securely bolted to the lower ends of the arms B, and, extending between said arms, serves as a brace for same. This connection by the blade of the arms serves to strengthen, brace, and give rigidity to the attachment, as will be seen.

By bolting the blades to the arms, as described, the former may be conveniently removed for the purpose of sharpening, or for other purposes desired.

The body or stock A has its rear side grooved longitudinally at *a* to fit the cultivator-standard, and has formed through it an opening, *d*, for the bolt D. At its outer end the opening *d* is enlarged, forming an angular socket to receive the angular head of the bolt D, which bolt passes through the cultivator-standard, and is secured by a nut or in other suitable manner.

In practice I form the attachments some rights and some lefts—that is to say, inclined to the right or left—and usually employ two rights and two lefts on a cultivator. By varying the arrangements of the attachments and by using them in various arrangements in conjunction with cultivator-teeth they may be caused to treat the weeds in different ways, as will now be described.

In Fig. 1 the blades are set properly for use when the rows are far apart. When the rows are closer, the blades may be set as shown in Fig. 5, and so clean two rows at once. In the arrangements shown in Figs. 1 and 5 nothing will be thrown against the growing plants which would tend to choke them. When the plants are more advanced and it is desirable to have some soil and the cut of the weeds drawn down to the plants, the parts may be arranged as shown in Fig. 6 or in Fig. 7.

In Figs. 8 and 9 the attachments are shown combined with the shovels, the arrangement shown in Fig. 8 being adapted to cut the weeds off close to the plants and stir the soil, while that shown in Fig. 9 stirs the ground close to the plants and cuts the weeds off between the rows.

It will be seen that the device may be arranged to throw the weeds to or from the growing plants, to cut such weeds off above, at, or below the ground-surface, and may be used in conjunction with the cultivator-teeth for the purpose of simultaneously cultivating the plants and removing the weeds, as explained in the foregoing description.

Having thus described my invention, what I claim as new is—

1. A weeding attachment, substantially as described, consisting of the stock or body A, the arms B B, extended from said body, one of said arms being longer than the other, and the scraper-blade extending between and secured to said arms, substantially as set forth.

2. A weeding attachment consisting of the stock or body A, having a groove, *a*, in its rear side and provided with a bolt-opening, *d*, the forward end of which is enlarged and provides an angular socket for the head of the connecting-bolt, the arms extended from said stock or body part, and the blade extended between and secured to the free ends of said arms, all substantially as and for the purposes specified.

GUSTAVUS HAUSCHILD.

Witnesses:
JNO. N. STAUFFER,
P. DAVIS.